United States Patent
Yasan et al.

(10) Patent No.: US 9,240,035 B2
(45) Date of Patent: *Jan. 19, 2016

(54) METHODS FOR REDUCING ROW AND COLUMN PATTERNS IN A DIGITAL IMAGE

(71) Applicant: Foveon, Inc., Santa Clara, CA (US)

(72) Inventors: Alireza Yasan, San Jose, CA (US); Lukac Rastislav, San Jose, CA (US)

(73) Assignee: Foveon, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/230,661

(22) Filed: Mar. 31, 2014

(65) Prior Publication Data

US 2014/0320496 A1  Oct. 30, 2014

Related U.S. Application Data

(63) Continuation of application No. 13/473,287, filed on May 16, 2012, now Pat. No. 8,687,885.

(60) Provisional application No. 61/487,970, filed on May 19, 2011.

(51) Int. Cl.
  *G06K 9/00*  (2006.01)
  *G06T 5/00*  (2006.01)
  *G06K 9/40*  (2006.01)

(52) U.S. Cl.
  CPC .. *G06T 5/002* (2013.01); *G06K 9/40* (2013.01)

(58) Field of Classification Search
  None
  See application file for complete search history.

(56) References Cited

U.S. PATENT DOCUMENTS

| | | |
|---|---|---|
| 5,065,444 A | 11/1991 | Garber |
| 5,606,375 A | 2/1997 | Lee |
| 5,617,461 A | 4/1997 | Schreiner |
| 5,724,259 A * | 3/1998 | Seymour et al. ............. 382/199 |
| 5,734,742 A * | 3/1998 | Asaeda et al. ............... 382/141 |
| 5,799,111 A | 8/1998 | Guissin |
| 5,844,627 A * | 12/1998 | May et al. ..................... 348/607 |
| 5,881,182 A * | 3/1999 | Fiete et al. .................... 382/275 |
| 6,335,990 B1 | 1/2002 | Chen et al. |
| 6,646,681 B1 * | 11/2003 | Macy et al. ................... 348/241 |
| 6,763,129 B1 | 7/2004 | Honda et al. |
| 6,771,793 B1 * | 8/2004 | Yamada ........................ 382/264 |
| 7,453,587 B2 * | 11/2008 | Gardner et al. ............... 358/1.1 |
| 7,689,055 B2 | 3/2010 | Zhang et al. |
| 2003/0091243 A1 | 5/2003 | Sasada |
| 2005/0135700 A1 * | 6/2005 | Anderson ..................... 382/261 |
| 2006/0103892 A1 | 5/2006 | Schulze et al. |
| 2006/0104538 A1 * | 5/2006 | Izumi ............................ 382/275 |
| 2006/0182364 A1 | 8/2006 | John |
| 2006/0262210 A1 * | 11/2006 | Smith et al. .................. 348/308 |
| 2006/0279632 A1 * | 12/2006 | Anderson ..................... 348/164 |
| 2006/0291742 A1 | 12/2006 | Zhang et al. |
| 2008/0170772 A1 * | 7/2008 | Lindberg et al. ............. 382/133 |

(Continued)

*Primary Examiner* — Bhavesh Mehta
*Assistant Examiner* — Feng Niu
(74) *Attorney, Agent, or Firm* — Leech Tishman Fuscaldo & Lampl; Kenneth D'Alessandro, Esq.

(57) ABSTRACT

A method for performing column/row pattern suppression in a digital input image includes creating a smoothed version of the input image by averaging a set of columns/rows neighboring around the column/row being corrected. A difference image is constructed by subtracting the smoothed image from the input image. New column/row intensities are computed from the difference image. An output image is constructed with suppressed column/row patterns by subtracting the new column/row intensities from the input image.

16 Claims, 5 Drawing Sheets

(56) References Cited

U.S. PATENT DOCUMENTS

2009/0148005 A1 6/2009 Rowe
2010/0246922 A1 9/2010 Uchihara et al.
2011/0123070 A1 5/2011 Sebok
2011/0268368 A1 11/2011 Toyoda et al.

* cited by examiner

METHODS FOR REDUCING ROW AND COLUMN PATTERNS IN A DIGITAL IMAGE

CROSS REFERENCE TO RELATED APPLICATIONS

The present application is a continuation application of U.S. patent application Ser. No. 13/473,287, filed May 16, 2012, entitled "Methods for Reducing Row and Column Patterns in a Digital Image", now U.S. Pat. No. 8,687,885, issued Apr. 1, 2014, which claims the benefits of U.S. Provisional Patent Application No. 61/487,970, filed May 19, 2011, entitled "Methods for Reducing Row and Column Patterns in a Digital Image", both of which applications are incorporated herein by reference in their entirety.

BACKGROUND OF THE INVENTION

1. Field of the Invention

The present invention relates to processing of digital images. More particularly, the present invention relates to methods for suppressing row and column patterns in a digital image.

2. Description of Related Art

Structured noise in digital images can have the form of row and column patterns, typically produced in a digital camera due to the sensor design (e.g., signal readout architecture) or various other patterns introduced to the image via image processing.

In digital cameras, column-correlated gain and offset mismatches, due to slight mismatches in column readout circuits, are common. If these mismatches are large enough, they may show up as high-frequency column patterns in the images. The column-correlated mismatches become more pronounced when using a column-parallel readout scheme, using one analog-to-digital converter (ADC) per column. While in most cases the column-correlated mismatches can be calibrated out (this type of mismatch is usually in the form of an offset, and can be calibrated out either by dedicated on-chip circuitry or by computing column offsets from a dark frame in calibration), in some cases these mismatches are not easily modeled (such as when a nonlinear ADC transfer function is used, which results in errors that are not purely offset; this kind of error is signal intensity dependent). In such cases, column offset calibration alone will not remove the column-correlated mismatches completely, and high-frequency column patterns may still remain visible in processed images.

In addition to column patterns, row patterns can also create visible artifacts in digital images. Although the source of row patterns is different from column patterns (row noise is usually a result of sampling of the power supply noise onto the pixel output), their visibility in the images can still be important, especially under low-light conditions. Similar to column patterns, row patterns usually cannot be fully removed by standard approaches, resulting in the presence of high-frequency row patterns in processed images.

In order for column or row patterns to be visible, average intensity of a given column or row needs to stand out with respect to the neighboring columns or rows, respectively. In this proposed method, the intensity of each column/row is replaced by the average of its neighbors. This results in the smoothing of the column/row patterns, which makes them less visible in the processed image.

The most common way of suppressing row and column noise in a digital image is applying a local smoothing technique. These techniques usually operate directly on the pixel values by defining a moving window and estimating the pixel value in the central window position using the pixel values located inside the window. The supporting window can have an arbitrary shape, ranging from one-dimensional to various two-dimensional windows. Unfortunately, these techniques often produce unsatisfactory results as they cannot fully remove structured noise and also tend to suppress the desired image features such as edges and image details. Therefore, a different approach is needed.

SUMMARY OF THE INVENTION

Methods are disclosed that can effectively suppress row and column patterns in the image, without blurring image edges and fine details. Moreover, this method is simple, fast, and easy to implement. Advantages of the methods of the present invention are the simplicity and effectiveness of the approach in improving image quality by reducing row and column patterns visibility without compromising image details.

According to a first aspect of the present invention the intensity of each column or row is replaced by the average of its neighbors. This results in the smoothing of the column/row patterns, which makes them less visible in the processed image.

BRIEF DESCRIPTION OF THE DRAWINGS

Additional advantages and details of the invention are explained below with reference to the exemplary embodiments illustrated in the accompanying schematic figures, in which like reference numbers identify like parts throughout.

DESCRIPTION OF THE INVENTION

Persons of ordinary skill in the art will realize that the following description of the present invention is illustrative only and not in any way limiting. Other embodiments of the invention will readily suggest themselves to such skilled persons.

The methods of the present invention can be used to suppress both row and column noise by applying the smoothing operation in the horizontal and vertical direction, respectively. In this document, the proposed smoothing concept is described in the context of column noise suppression. Using the same concept to suppress row noise is straightforward, that is, applying it to the rows (horizontal direction) instead of columns (vertical direction).

Figures 1, 2:
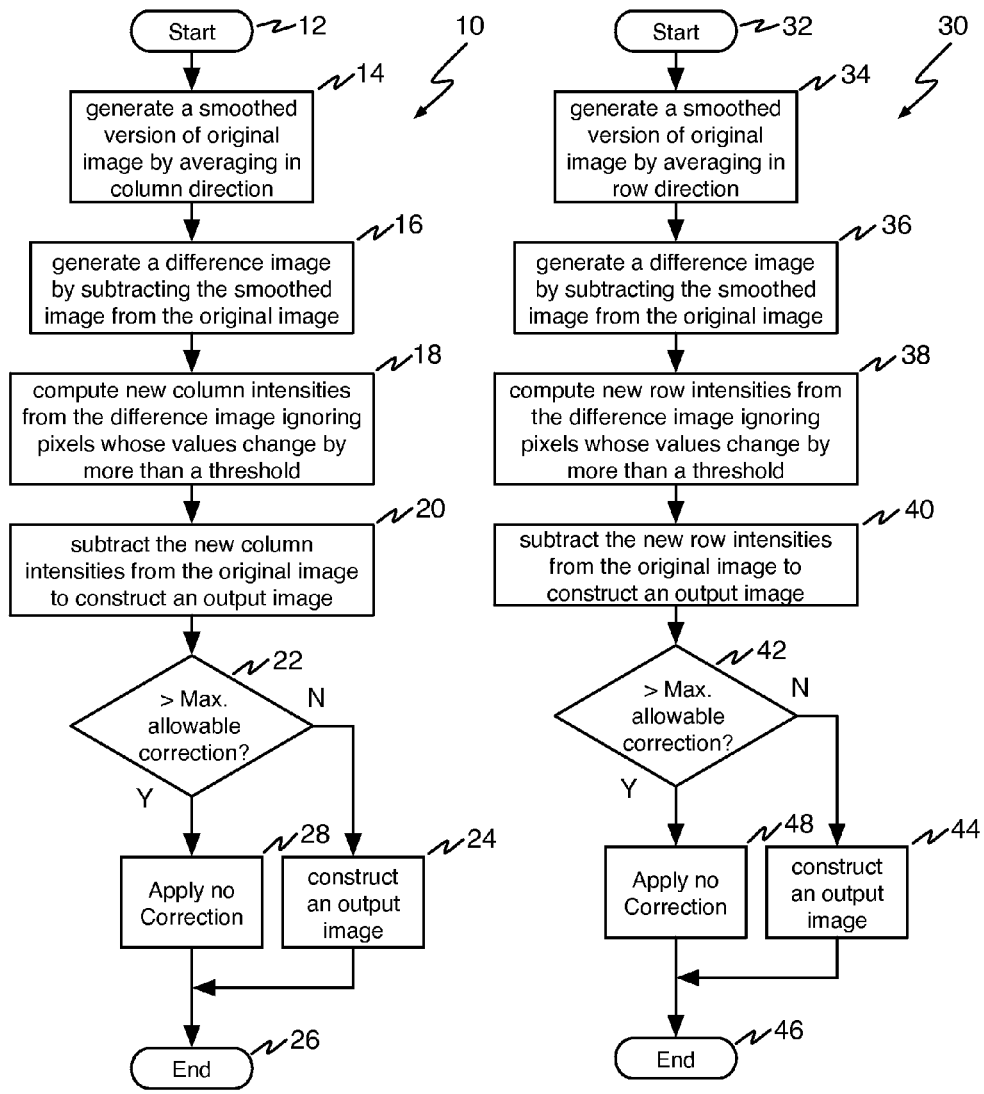
FIG. 1 is a flow diagram showing an illustrative embodiment of a method for column noise suppression according to the present invention.
FIG. 2 is a flow diagram showing an illustrative embodiment of a method for row noise suppression according to the present invention.

Referring first to FIG. 1 an illustrative method 10 is described. The method begins at reference numeral 12. In the case of column noise suppression, at reference numeral 14, first a smoothed version of the input image is created by averaging a set of columns neighboring around the column being corrected. According to one embodiment of the invention, between 1 and 7 columns are used on either side of the column being corrected. Then, at reference numeral 16, a difference image is constructed by subtracting the smoothed image from the input image.

Since column mismatches may be intensity dependent and tend to be more visible in flat regions of the image, it would be ideal to average only the portions of the scene where there are flat areas. The smoothed image is going to be blurry compared to the original image. This means that the value of the pixels at the edges can change significantly. In calculating the new column intensities, the pixels (referred to herein as "edge pixels") whose values change by more than a pass threshold will not be taken into account. The value of the pass threshold is determined empirically, based on subjective observation.

At reference numeral 18, the new column intensities are computed from the difference image with the edge pixels taken out. In one exemplary embodiment of the invention, a correction value is subtracted from the image.

At reference numeral 20, the image with suppressed column patterns is constructed by subtracting the new computed column intensities from the input image. This is performed on a pixel by pixel basis. To prevent the algorithm from failing in cases where vertically-aligned high-contrast features are present in the image and column averaging will result in partial transfer of the high-contrast pattern to the adjacent columns, a parameter is introduced which defines the maximum allowable correction amount. This parameter may be determined empirically (e.g., in the camera calibration phase) based on the evaluation of test images. At reference numeral 22 it is determined whether a column average of the difference image exceeds this parameter value. If the column average of the difference image does not exceed this parameter value, an output image is constructed at reference numeral 24 and the method ends at reference numeral 26. If the column average of the difference image exceeds this parameter value, then no correction will be performed on that particular column as reflected at reference numeral 28. The method then ends at reference numeral 26.

In the case of row noise suppression, a method 30 is performed in the horizontal direction as will now be illustrated with reference to FIG. 2. The method begins at reference numeral 32. In the case of row noise suppression, at reference numeral 34, first a smoothed version of the input image is created by averaging a set of rows neighboring around the row being corrected. According to one embodiment of the invention between 1 and 7 rows are used on either side of the row being corrected. Then, at reference numeral 36, a difference image is constructed by subtracting the smoothed image from the input image.

Since row mismatches may be intensity dependent and tend to be more visible in flat regions of the image, it would be ideal to average only the portions of the scene where there are flat areas. The smoothed image is going to be blurry compared to the original image. This means that the value of the pixels at the edges can change significantly. In calculating the new row intensities, the pixels (referred to herein as "edge pixels") whose values change by more than a predetermined pass threshold will not be taken into account.

At reference numeral 38, the new row intensities are computed from the difference image with the edge pixels taken out. In one exemplary embodiment of the invention, a correction value is subtracted from the image.

Next, at reference numeral 40, the image with suppressed row patterns is constructed by subtracting the new computed row intensities from the input image, done on a pixel by pixel basis. To prevent the algorithm from failing in cases where horizontally-aligned high-contrast features are present in the image and row averaging will result in partial transfer of the high-contrast pattern to the adjacent rows, a parameter is introduced which defines the maximum allowable correction amount. If a row average of the difference image exceeds this parameter value, then no correction will be performed on that particular row. At reference numeral 42 it is determined whether a row average of the difference image exceeds this parameter value. If the row average of the difference image does not exceed this parameter value, an output image is constructed at reference numeral 44 and the method ends at reference numeral 46. If the row average of the difference image exceeds this parameter value, then no correction will be performed on that particular row as reflected at reference numeral 48. The method then ends at reference numeral 46.

Should both row and column patterns be suppressed in the image, the methods shown in FIGS. 1 and 2 are both performed on the image. The proposed algorithm is applied to the input first in the vertical (or horizontal) direction to produce an intermediate image which should be then processed by applying the proposed algorithm to the intermediate image in the horizontal (or vertical) direction. This completes the proposed smoothing procedure.

In one example, the input image is directly passed through the proposed smoothing procedure. The procedure may include the edge detection process to localize the slowly varying image regions. In the case of grayscale image, the application of the proposed solution is straightforward. In the case of color image, each color channel should be processed separately.

Figure 3:
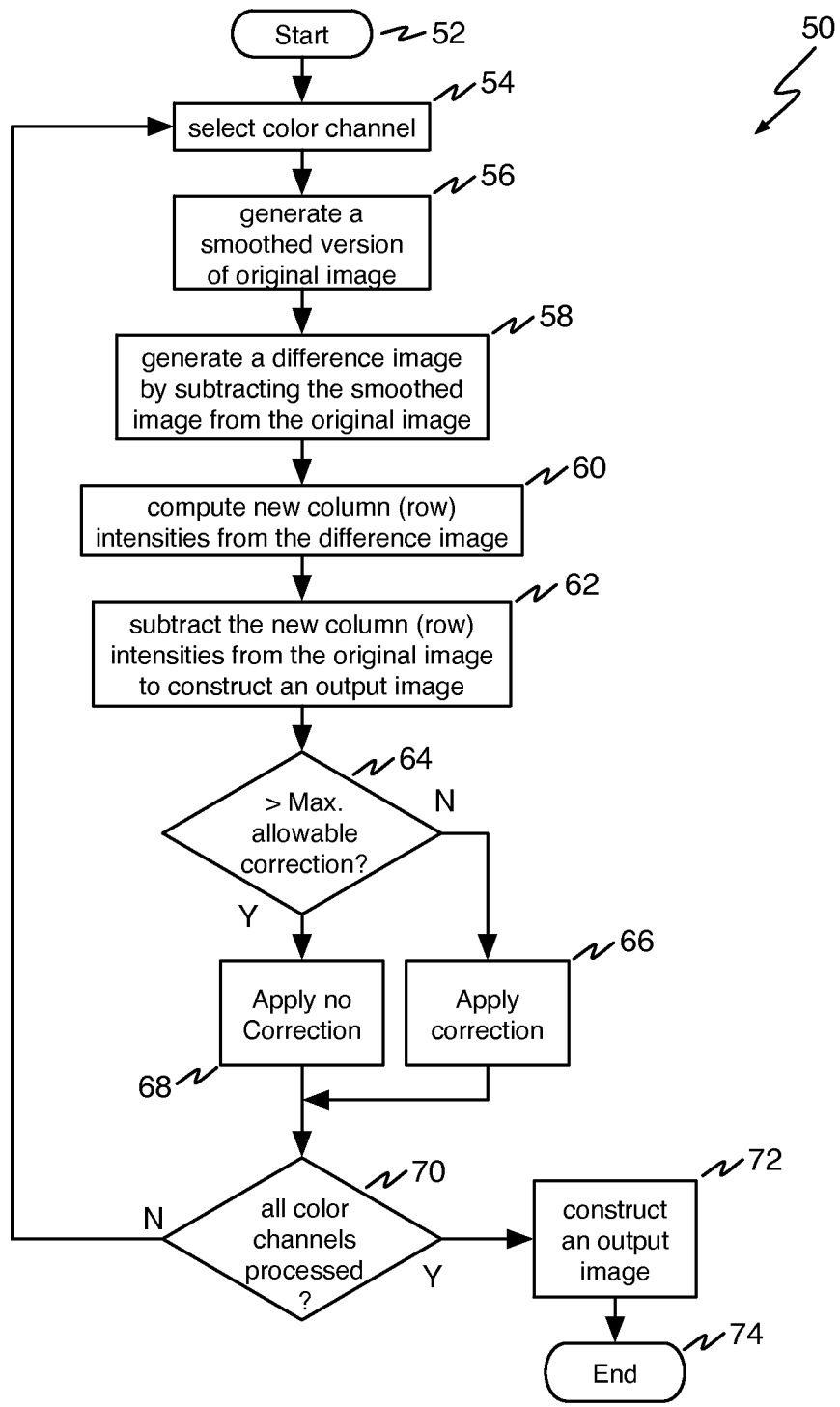
FIG. 3 is a flow diagram showing an illustrative embodiment of a method for column or row noise suppression in a color image according to the present invention.

Referring now to FIG. 3, a column or row noise-suppression method 50 for a color image is now shown. The method begins at reference numeral 52. First, at reference numeral 54, a color channel of the image is selected. At reference numeral 56, a smoothed version of the input image is created by averaging a set of columns (or rows) neighboring around the column (or row) being corrected. Then, at reference numeral 58, a difference image is constructed by subtracting the smoothed image from the input image.

As in noise suppression of a grayscale image, it would be ideal to average only the portions of the scene where there are flat areas. The smoothed image is going to be blurry compared to the original image. This means that the value of the pixels at the edges can change significantly. In calculating the new intensities, the pixels (referred to herein as "edge pixels") whose values change by more than a predetermined pass threshold will not be taken into account.

At reference numeral 60, the new column (or row) intensities are computed from the difference image with the edge pixels taken out. In one exemplary embodiment of the invention, a correction value is subtracted from the image. In other embodiments of the invention, the result of edge detection applied either to the selected color channel or the combination (e.g., average or weighted average) of at least two color channels, can be used to guide the smoothing process in each color channel.

At reference numeral 62, the image with suppressed column (or row) patterns is constructed by subtracting the new computed column intensities from the input image. This is performed on a pixel by pixel basis. To prevent the algorithm from failing in cases where vertically-aligned (or horizontally-aligned) high-contrast features are present in the image and averaging will result in partial transfer of the high-contrast pattern to the adjacent columns (or rows), a parameter is introduced which defines the maximum allowable correction amount. This parameter may be determined empirically (e.g., in the camera calibration phase) based on the evaluation of test images. At reference numeral 64 it is determined whether a column (or row) average of the difference image exceeds this parameter value. If the column (or row) average of the difference image does not exceed this parameter value, correction to the color channel is applied at reference numeral 66. If the column (or row) average of the difference exceeds this parameter value, then no correction will be performed on that particular column (or row) as reflected at reference numeral 68.

At reference numeral 70, it is determined whether all color channels have been processed. If not, the method returns to reference numeral 54, where another color channel is selected for processing. If all color channels have been processed, the method proceeds to reference numeral 72, where an output image is constructed. The method then ends at reference numeral 74.

In another example, the input image is divided into a number of either non-overlapping or overlapping spatial regions. The proposed smoothing procedure, that may include the edge detection process, is applied to each of these spatial regions to produce their enhanced versions. The final image is obtained by spatially combining the enhanced regions. This embodiment of the invention is illustrated in FIG. 4.

Figure 4:
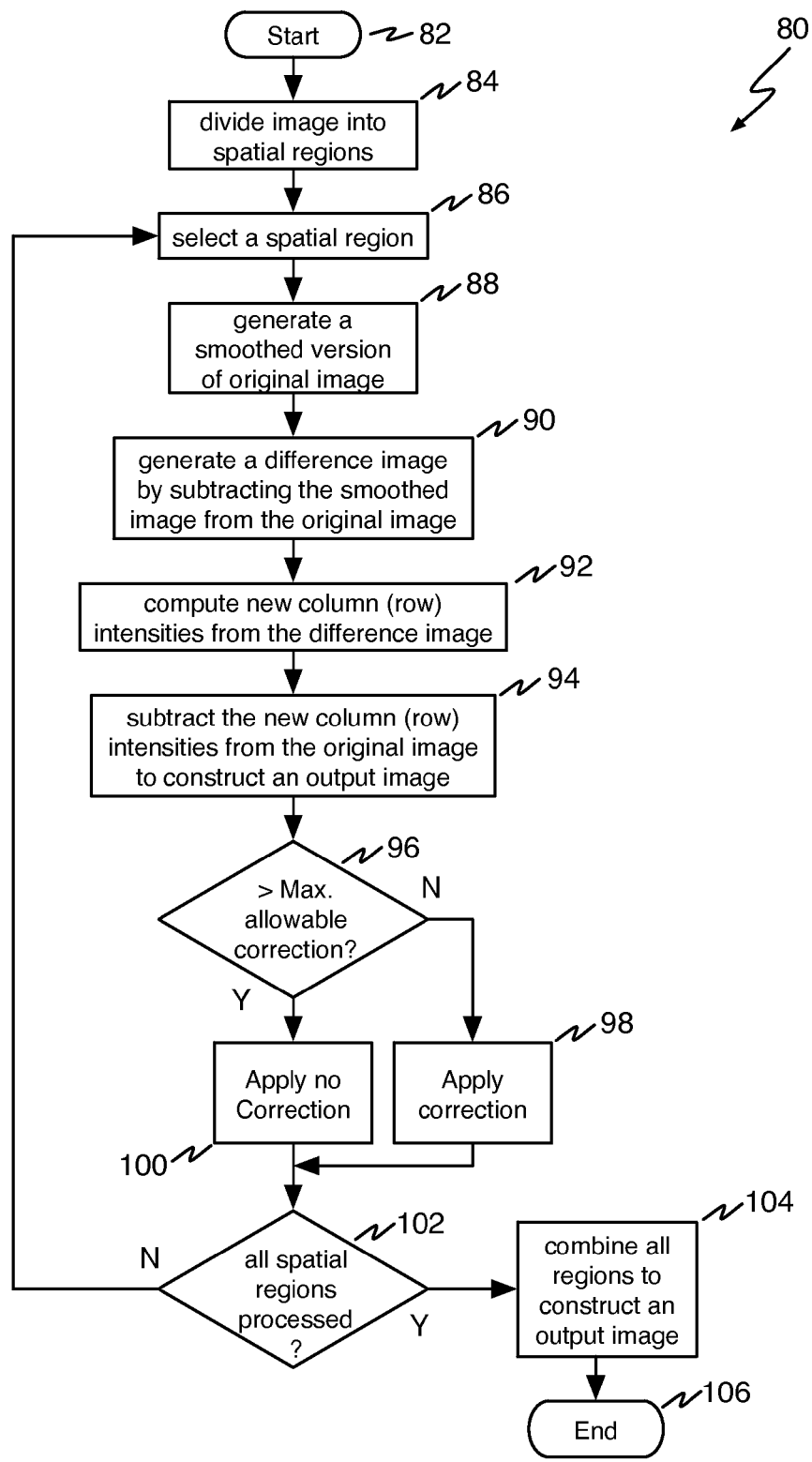
FIG. 4 is a flow diagram showing an illustrative embodiment of a method for column or row noise suppression wherein the image is divided into spatial regions for processing according to the present invention.

Referring now to FIG. 4, an illustrative method 80 is described. The method begins at reference numeral 82. At reference numeral 84, the image is divided into spatial regions. Division of the image may be accomplished by means of image segmentation or by simply splitting the image into regular-sized square or rectangular blocks. Next, at reference numeral 86, one of the spatial regions is selected for processing.

At reference numeral 88, a smoothed version of the input image is created by averaging a set of columns or rows neighboring around the column or row being corrected. According to one embodiment of the invention between 1 and 7 columns are used on either side of the column being corrected. Then, at reference numeral 90, a difference image is constructed by subtracting the smoothed image from the input image. As with the other embodiments of the present invention, the pixels (referred to herein as "edge pixels") whose values change by more than a predetermined pass threshold will not be taken into account in this process.

At reference numeral 92, the new column or row intensities are computed from the difference image with the edge pixels taken out. In one exemplary embodiment of the invention, a correction value is subtracted from the image.

At reference numeral 94, the image with suppressed column patterns is constructed by subtracting the new computed column intensities from the input image. This is performed on a pixel by pixel basis. To prevent the algorithm from failing in cases where vertically-aligned or horizontally-aligned high-contrast features are present in the image and column or row averaging will result in partial transfer of the high-contrast pattern to the adjacent columns or rows, a parameter is introduced which defines the maximum allowable correction amount. This parameter may be determined empirically (e.g., in the camera calibration phase) based on the evaluation of test images. At reference numeral 96 it is determined whether an average of the difference image exceeds this parameter value. If the average of the difference does not exceed this parameter value, an output spatial region is constructed at reference numeral 98. If the average of the difference exceeds this parameter value, then no correction will be performed on that particular column or row as reflected at reference numeral 100.

At reference numeral 102, it is determined whether all spatial regions have been processed. If not, then process returns to reference numeral 86, where another spatial region is selected for processing. If all spatial regions have been processed, the new values for all spatial regions are combined to construct an output image at reference numeral 104. The method then ends at reference numeral 106.

In another example, the input image is divided into either non-overlapping or overlapping intensity bands. The proposed smoothing procedure, that may include the edge detection process, is applied to each of these intensity bands to produce their enhanced versions. The final image is obtained by combining the enhanced intensity bands. An exemplary embodiment of this process is illustrated in FIG. 5.

Figure 5:
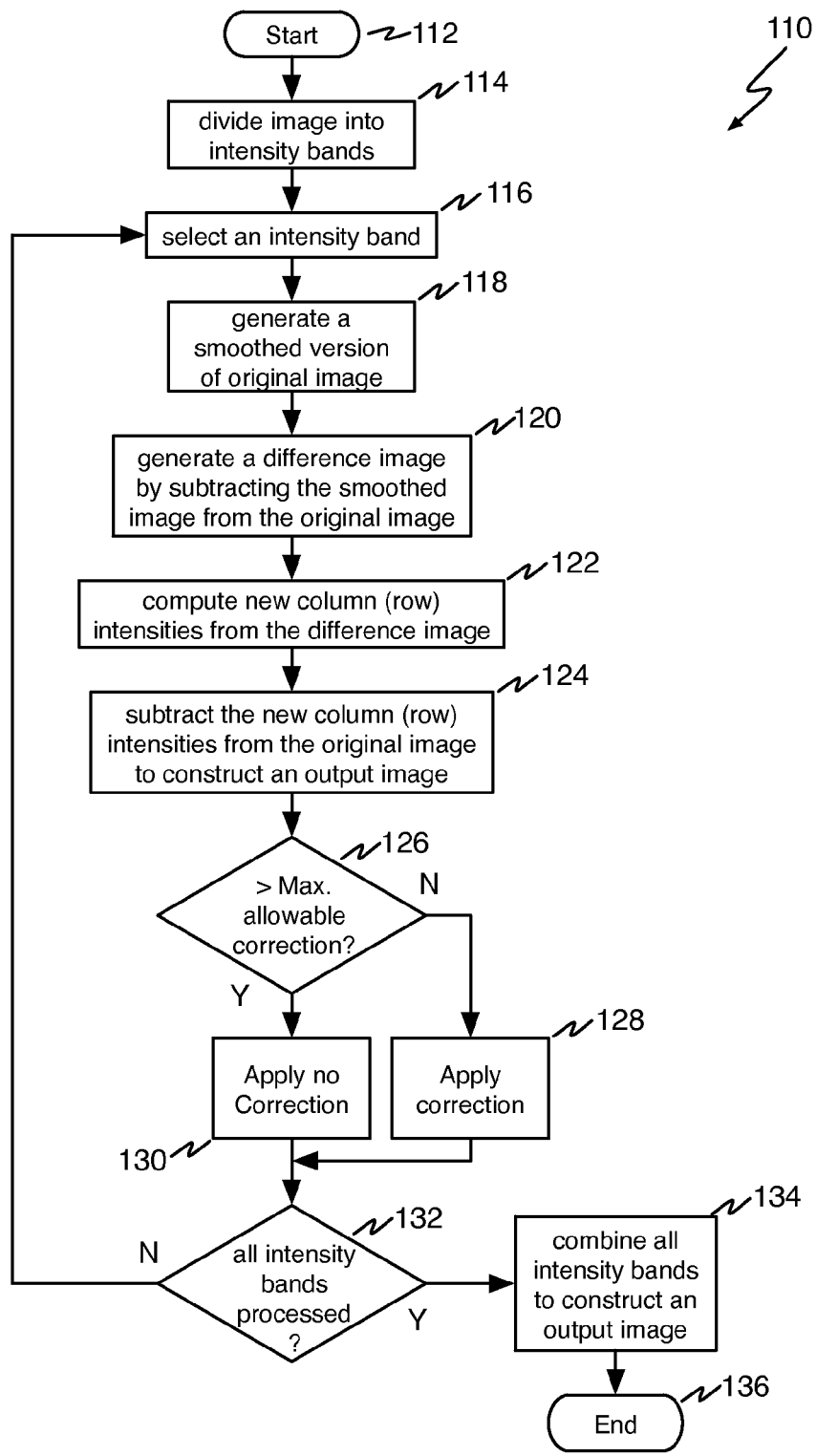
FIG. 5 is a flow diagram showing an illustrative embodiment of a method for column or row noise suppression wherein the image is divided into intensity bands for processing according to the present invention.

Referring now to FIG. 5, an illustrative method 110 is described. The method begins at reference numeral 112. At reference numeral 114, the image is divided into intensity bands. Division of the image may be accomplished by means of multi-level thresholding, bit-level decomposition, or range decomposition. Next, at reference numeral 116, one of the intensity bands is selected for processing.

At reference numeral 118, a smoothed version of the input image is created by averaging a set of columns or rows neighboring around the column or row being corrected. Then, at reference numeral 120, a difference image is constructed by subtracting the smoothed image from the input image. As with the other embodiments of the present invention, the pixels (referred to herein as "edge pixels") whose values change by more than a predetermined pass threshold will not be taken into account in this process.

At reference numeral 122, the new column or row intensities are computed from the difference image with the edge pixels taken out. In one exemplary embodiment of the invention, a correction value is subtracted from the image.

At reference numeral 124, the image with suppressed column patterns is constructed by subtracting the new computed column intensities from the input image. This is performed on a pixel by pixel basis. To prevent the algorithm from failing in cases where vertically-aligned or horizontally-aligned high-contrast features are present in the image and column or row averaging will result in partial transfer of the high-contrast pattern to the adjacent columns or rows, a parameter is introduced which defines the maximum allowable correction amount. This parameter may be determined empirically (e.g., in the camera calibration phase) based on the evaluation of test images. At reference numeral 126 it is determined whether an average of the difference image exceeds this parameter value. If the average of the difference does not exceed this parameter value, an output intensity band is constructed at reference numeral 128. If the average of the difference exceeds this parameter value, then no correction will be performed on that particular column or row as reflected at reference numeral 130.

At reference numeral 132, it is determined whether all intensity bands have been processed. If not, then process returns to reference numeral 86, where another intensity band is selected for processing. If all intensity bands have been processed, the new values for all intensity bands are combined to construct an output image at reference numeral 134. The method then ends at reference numeral 136.

Figures 6, 7:
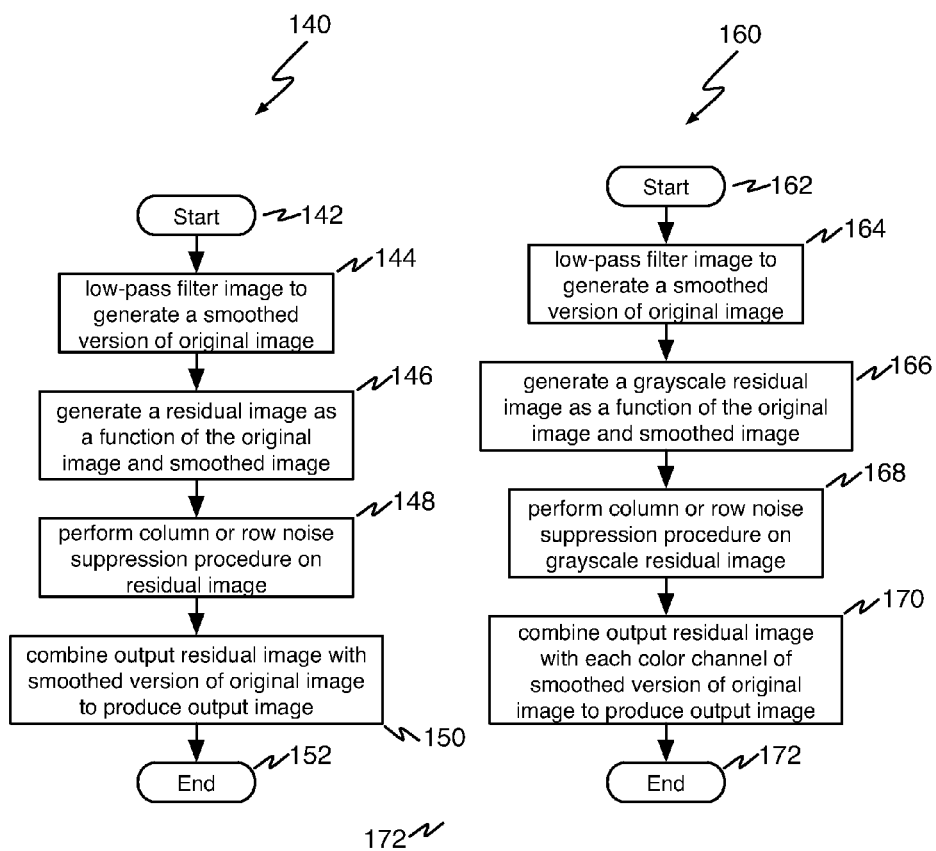
FIG. 6 is a flow diagram showing an illustrative embodiment of another illustrative method for column or row noise suppression according to the present invention.
FIG. 7 is a flow diagram showing another illustrative embodiment of a method for column or row noise suppression according to the present invention.

In yet another example, illustrated with reference to FIG. 6, a method 140 for column or row noise suppression is disclosed. The process begins at reference numeral 142. At reference numeral 144, the input image is first passed through low-pass filtering to create a smoothed version of the original image. Then, at reference numeral 146, a so-called residual image is created as a function (i.e., difference or ratio) of the original image and its smoothed version. Then, at reference numeral 148, the column or row noise suppression procedure disclosed herein is applied to the residual image to produce an output residual image. At reference numeral 150, the output residual image is combined (i.e., addition or multiplication; or generally speaking, using an inverse function to the function used to generate the residual signal) with the smoothed version of the original image to produce the output image with suppressed row and column patterns. The process ends at reference numeral 152.

In yet another example, illustrated with reference to FIG. 7, an alternate method 160 for column or row noise suppression in a color image is disclosed. The process begins at reference numeral 162. At reference numeral 164, the input image is first passed through low-pass filtering to create a smoothed version of the original image. Then, at reference numeral 166, a so-called grayscale residual image is created as a function (i.e., difference or ratio) of the original image and its smoothed version. In one example, a grayscale residual image is created as a function of grayscale versions of the original image and its smoothed version. In another example, a grayscale version of the residual image is created by combining the color components of the residual image in each pixel location using standard averaging or weighted averaging techniques. At reference numeral 168, the column or row noise suppression procedure disclosed herein is applied to the grayscale residual image to produce an output residual image. At reference numeral 170, the final residual image is then combined with each color channel to produce the output image with suppressed row and column patterns. Combining is performed by adding the final residual image to each color channel of the smoothed version of the original image where the original residual image is obtained as the difference between the original image and its smoothed version. Alternatively, combining is performed by multiplying the final residual image with to each channel of the smoothed version of the original image when the original residual image is obtained as the ratio between the original image and its smoothed version. The process ends at reference numeral 172.

According to another aspect of the present invention, the various methods disclosed herein may be combined. For example, the output image generated using one of the disclosed methods can be used as the input for some other of the disclosed methods to further improve the smoothing performance. Alternatively, the output images generated using at least two different methods can be blended or combined. Eventually, any of the disclosed methods can be applied in more than one iteration.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. A method for performing column/row pattern suppression in a digital input image, comprising:
    a) dividing the input image into regions;
    b) selecting a region that has not been processed;
    c) generating a smoothed version of the input image in the selected region by averaging a set of columns/rows neighboring around a column/row being corrected;
    d) constructing a difference residual image in the selected region by subtracting the smoothed image from the input image in the selected region;
    e) computing new column/row intensities in the selected region from the difference residual image;
    f) constructing an output image in the selected region with suppressed column/row patterns by subtracting the new column/row intensities in the selected region from the input image in the selected region, including defining a maximum allowable correction amount and performing no correction on a column/row in the output image if the column/row average of the difference residual image exceeds the maximum allowable correction amount;
    repeating b) through f) until all of the regions of the input image have been processed; and
    combining all of the output images from all of the processed regions to generate an output image.

2. The method of claim 1, wherein:
    dividing the input image into regions comprises dividing the input image into color channels; and
    combining all of the output images from all of the processed regions to generate an output image comprises combining all of the output images from all of the processed color channels to generate an output image.

3. The method of claim 1, wherein:
    dividing the input image into regions comprises dividing the input image into spatial regions; and
    combining all of the output images from all of the processed regions to generate an output image comprises combining all of the output images from all of the processed spatial regions to generate an output image.

4. The method of claim 1, wherein:
    dividing the input image into regions comprises dividing the input image into intensity bands; and
    combining all of the output images from all of the processed regions to generate an output image comprises combining all of the output images from all of the processed intensity bands to generate an output image.

5. A method for performing column/row pattern suppression in a digital input image, comprising:
    a) dividing the input image into spatial regions;
    b) selecting a spatial region that has not been processed;
    c) generating a smoothed version of the input image in the selected spatial region by averaging a set of columns/rows neighboring around a column/row being corrected;
    d) constructing a difference residual image in the selected spatial region by subtracting the smoothed image from the input image in the selected spatial region;
    e) computing new column/row intensities in the selected spatial region from the difference residual image;
    f) constructing an output image in the selected spatial region with suppressed column/row patterns by subtracting the new column/row intensities in the selected spatial region from the input image in the selected spatial region, including defining a maximum allowable correction amount and performing no correction on a column/row in the output image if the column/row average of the difference residual image exceeds the maximum allowable correction amount;
    repeating b) through f) until all of the spatial regions of the input image have been processed; and
    combining all of the output images from all of the processed spatial regions to generate an output image.

6. The method of claim 5, wherein computing new column/row intensities from the difference image comprises ignoring pixels whose values change by more than a pass threshold.

7. The method of claim 5, wherein dividing the input image into spatial regions comprises dividing the input image into non-overlapping spatial regions.

8. The method of claim 5, wherein dividing the input image into spatial regions comprises dividing the input image into overlapping spatial regions.

9. The method of claim 5, wherein computing new column/row intensities in the selected spatial region from the difference residual image comprises subtracting a correction value from the difference residual image.

10. A method for performing column/row noise suppression in a digital input image, comprising:
   a) dividing the input image into intensity bands;
   b) selecting an intensity band that has not been processed;
   c) generating a smoothed version of the input image in the selected intensity band by averaging a set of columns/rows neighboring around a column/row being corrected;
   d) constructing a difference image in the selected intensity band by subtracting the smoothed image from the input image in the selected intensity band;
   e) computing new column/row intensities in the selected intensity band from the difference residual image;
   f) constructing an output image in the selected intensity band with suppressed column/row patterns by subtracting the new column/row intensities in the selected intensity band from the input image in the selected intensity band, including defining a maximum allowable correction amount and performing no correction on a column/row in the output image if the column/row average of the difference image exceeds the maximum allowable correction amount;
   repeating b) through f) until all of the intensity bands of the input image have been processed; and
   combining all of the output images from all of the processed spatial regions to generate an output image.

11. The method of claim 10, wherein computing new column/row intensities from the difference image comprises ignoring pixels whose values change by more than a pass threshold.

12. The method of claim 10, wherein dividing the input image into intensity bands comprises dividing the input image into non-overlapping intensity bands.

13. The method of claim 10, wherein dividing the input image into intensity bands comprises dividing the input image into overlapping intensity bands.

14. The method of claim 10, wherein computing new column/row intensities in the selected intensity band from the difference residual image comprises subtracting a correction value from the difference residual image.

15. A method for performing column/row noise suppression in a digital input image, comprising:
   a) dividing the input image into regions;
   b) selecting a region that has not been processed;
   c) generating a smoothed version of the input image in a selected region by applying a low pass filter to the input image;
   d) generating a grayscale residual image as a function of the input image and the smoothed image;
   e) computing new column/row intensities in the selected region from the grayscale residual image;
   f) constructing an output image with suppressed column/row patterns by subtracting the new column/row intensities from the input image, including defining a maximum allowable correction amount and performing no correction on a column/row in the output image if the column/row average of the grayscale residual image exceeds the maximum allowable correction amount;
   repeating b) through f) until all of the regions of the input image have been processed; and
   combining all of the output images from all of the processed regions to generate an output image.

16. The method of claim 15, wherein computing new column/row intensities from the grayscale image comprises ignoring pixels whose values change by more than a pass threshold.

* * * * *